US006537180B2

(12) United States Patent
Kim et al.

(10) Patent No.: US 6,537,180 B2
(45) Date of Patent: Mar. 25, 2003

(54) HYDRAULIC CONTROL SYSTEM FOR AUTOMOTIVE AUTOMATIC TRANSMISSION

(75) Inventors: Tae-Kyun Kim, Yongin (KR); Jae-Duk Jang, Yongin (KR); Jong-Sool Park, Yongin (KR); Hyun-Soo Shim, Yongin (KR); Jin-Hee Lee, Yongin (KR); Chang-Wook Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 09/750,159

(22) Filed: Dec. 29, 2000

(65) Prior Publication Data

US 2001/0053728 A1 Dec. 20, 2001

(30) Foreign Application Priority Data

Jun. 8, 2000 (KR) ............................................ 00-31289

(51) Int. Cl.$^7$ ............................................... F16H 61/26
(52) U.S. Cl. ........................................ 477/130; 477/158
(58) Field of Search ................................. 477/130, 906, 477/127, 143, 131, 158, 156

(56) References Cited

U.S. PATENT DOCUMENTS 5,980,427 A * 11/1999 Lee ............................ 477/158
6,027,427 A *  2/2000 Woo ........................... 477/130

FOREIGN PATENT DOCUMENTS

JP              088093      *  3/2000

* cited by examiner

Primary Examiner—Matthew C. Graham
(74) Attorney, Agent, or Firm—Birch, Stewart, Kolasch & Birch, LLP

(57) ABSTRACT

A hydraulic control system for an automotive automatic transmissions includes a pressure regulator for regulating hydraulic pressure, a pressure reducer having a reducing valve for reducing hydraulic pressure, a shift controller having a manual valve cooperating with a shift selector lever and connected to a plurality of range pressure lines, a pressure controller comprising first, second and third solenoid valves for controlling control pressure reduced by the reducing valve, and first, second and third pressure control valves for controlling hydraulic pressure supplied from the manual valve, the first, second and third pressure control valves being independently controlled by control pressure supplied from the first, second and third solenoid valves, respectively, a switching controller comprising a first switch valve for supplying hydraulic pressure from the first pressure control valve to one of first and second switching lines and a second switch valve for supplying hydraulic pressure from the third pressure control valve and the manual valve to first and second friction elements, a fail-safer comprising a first fail-safe valve for supplying hydraulic pressure from the first switch valve and the manual valve to a friction element operated in low L and reverse R ranges, and a second fail-safe valve for supplying hydraulic pressure from the second pressure control valve to a friction element operated in second and fourth speeds, and an N–R controller comprising an N–R control valve for supplying reverse pressure to a friction element operated in only a reverse R range.

21 Claims, 12 Drawing Sheets

FIG.2

| Shift Range | C1 | C2 | C3 | C4 | B1 | B2 | F1 | F2 |
|---|---|---|---|---|---|---|---|---|
| N,P | | | | | ○ | | | |
| 1 | ○ | | | ○ | | | ○ | ○ |
| 2 | ○ | | | ○ | | ○ | | ○ |
| 3 | ○ | ○ | | ○ | | | | ○ |
| 4 | | ○ | | | | ○ | | |
| Rev | | | ○ | ○ | ○ | | | |
| Low | ○ | | | ○ | ○ | | | |

HYDRAULIC CONTROL SYSTEM FOR AUTOMOTIVE AUTOMATIC TRANSMISSION

BACKGROUND OF THE INVENTION (a) Field of the Invention

The present invention relates to a hydraulic control system for automotive automatic transmissions.

(b) Description of the Related Art

Conventional automatic transmissions used in vehicles include a torque converter, a multi-stage gear shift mechanism connected to the torque converter, and a plurality of friction members actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated in an oil pump, to change shift ratios of the planetary gearset.

When designing such an automatic transmission, a design target is first selected, then a design concept that is good in the aspects of performance, endurance, reliability, and productivity is chosen.

When the design concept is selected, an automatic transmission is developed in three sections, a mechanical section, a hydraulic control section, and an electronic control section.

The mechanical section (powertrain) is usually formed of a compound planetary gear set having at least two simple planetary gear sets. The hydraulic control section controlling the mechanical section includes a pressure regulating part for regulating hydraulic pressure generated from a fluid pump, a manual/automatic shift control part for determining a shift mode, a hydraulic control part for controlling hydraulic pressure to improve shift quality and shift responsiveness, a hydraulic pressure distributing part for properly distributing hydraulic pressure to each friction element, and a damper clutch control part for controlling the operation of a damper clutch of a torque converter.

The hydraulic pressure distribution is varied by solenoid valves that are on/off or duty controlled by a transmission control unit. According to the variation of the distribution, the operation of the friction elements are controlled, thereby realizing the shift control.

Such a powertrain and hydraulic control system has been developed in a variety of types by many different automakers.

However, in the conventional automatic transmission, one control mechanism is controlling at least two friction elements, and thus the friction elements cannot be independently controlled. In addition, since the friction elements are directly controlled by primary control pressure from solenoid valves, solenoid valves having a high capacity and a high degree of preciseness are required, increasing manufacturing costs and operation noise.

SUMMARY OF THE INVENTION

Therefore, the present invention has been made in an effort to solve the above problems.

It is a first objective of the present invention to provide a hydraulic control system that can make it possible to use small solenoid valves by independently controlling friction elements and employing an indirect control method whereby secondary control pressure is supplied to the friction elements, thereby reducing manufacturing costs as well as operation noise and vibration.

It is a second objective of the present invention to provide a hydraulic control system that can maintain optimal hydraulic pressure by employing a line pressure regulating solenoid valve, thereby improving the fuel consumption ratio.

It is a third objective of the present invention to provided a hydraulic control system that can minimize shift shock during a manual shifting operation while reducing vibration and fuel consumption ratio by realizing a neutral control in a stop state during driving.

To achieve the above objectives, the present invention provides a hydraulic control system for an automotive automatic transmissions comprising:

a pressure regulator for regulating hydraulic pressure generated by a fluid pump;

a pressure reducer having a reducing valve for reducing hydraulic pressure regulated by the pressure regulator;

a shift controller having a manual valve cooperating with a shift selector lever and connected to a plurality of range pressure lines;

a pressure controller comprising first, second and third solenoid valves for controlling control pressure reduced by the reducing valve, and first, second and third pressure control valves for controlling hydraulic pressure supplied from the manual valve, the first, second and third pressure control valves being independently controlled by control pressure supplied from the first, second and third solenoid valves, respectively;

a switching controller comprising a first switch valve for supplying hydraulic pressure from the first pressure control valve to one of first and second switching lines and a second switch valve for supplying hydraulic pressure from the third pressure control valve and the manual valve to first and second friction elements;

a fail-safer comprising a first fail-safe valve for supplying hydraulic pressure from the first switch valve and the manual valve to a friction element operated in low L and reverse R ranges, and a second fail-safe valve for supplying hydraulic pressure from the second pressure control valve to a friction element operated in second and fourth speeds; and an N–R controller comprising an N–R control valve for supplying reverse pressure to a friction element operated in only a reverse R range.

The hydraulic control system may further comprise a fourth solenoid valve disposed between the reducing valve and the regulator valve.

The manual valve communicates with a line pressure line for receiving line pressure from the regulator valve, an N–D range pressure line connected to the first pressure control valve and a second fail-safe valve in neutral N and drive D ranges, a D range pressure line connected to the second pressure control valve, the first switch valve, the third pressure control valve, and the second switch valve in the drive D range, an L range pressure line connected to the first switch valve in the low L range, and an R range pressure line connected to the regulator valve, the second fail-safe valve, and the N–R control valve.

The first pressure control valve is provided with a first port for receiving reduced pressure from the reducing valve, a second port for receiving hydraulic pressure from the manual valve, a third port for supplying the hydraulic pressure fed through the second port to the first switch valve, and a fourth port for receiving control pressure from the first solenoid valve, the ports of the first pressure control valve being controlled by a valve spool installed in a valve body, the valve spool comprising a first land on which the hydraulic pressure fed through the first port acts, a second land on which the hydraulic pressure fed through the first port acts to open and close the second port, and a third land for selectively communicating the second port with the third port together with the second land, an elastic member being disposed between the valve body and the third land to bias the valve spool.

The second pressure control valve is provided with a first port for receiving the reduced pressure from the reducing valve, a second port for receiving hydraulic pressure from the manual valve, a third port for supplying the hydraulic pressure fed through the second port to the second fail-safe valve, and a fourth port for receiving control pressure from the second solenoid valve, the ports of the second pressure control valve being controlled by a valve spool installed in a valve body, the valve spool comprising a first land on which hydraulic pressure fed through the first port acts, a second land on which hydraulic pressure fed through the first port acts to selectively open and close the second port, and a third land for selectively communicating the second port with the third port together with the second land, an elastic member being disposed between the third land and the valve body to bias the valve spool.

The third pressure control valve is provided with a first port for receiving reduced pressure from the reducing valve, a second port for receiving hydraulic pressure from the manual valve, a third port for supplying the hydraulic pressure fed through the second port to the second switch valve, and a fourth port for receiving control pressure from the third solenoid valve, the ports of the third pressure control valve being controlled by a valve spool installed in a valve body, the valve spool comprising a first land on which the hydraulic pressure fed through the first port acts, a second land on which the hydraulic pressure fed through the first port acts to selectively open and close the second port, and a third land for selectively communicating the second port with the third port, an elastic member being disposed between the valve body and the third land to bias the valve spool.

The first switch valve is designed to supply N–D range pressure to one of a second clutch and a first brake.

The first switch valve is provided with a first port for receiving N–D range pressure from the manual valve as control pressure, a second port for receiving L range pressure from the manual valve as control pressure, a third port for receiving control pressure from the on/off solenoid valve, a fourth port for receiving hydraulic pressure from the first pressure control valve, a fifth port for supplying hydraulic pressure fed through the fourth port to the second clutch and the first and second fail-safe valves as control pressure, a sixth port for supplying hydraulic pressure fed through the fourth port to the first fail-safe valve, and first and second exhaust ports for exhausting hydraulic pressure returning to the fifth and sixth ports, the ports of the first switch valve being controlled by a valve spool installed in the valve body, the valve spool comprising a first land on which control pressure fed through the first port acts, a second land for selectively communicating the fourth port with the sixth port, a third land for selectively communicating the fourth port with the fifth port, a forth land on which control pressure fed through the third port acts, and a fifth land on which control pressure fed through the second port acts.

The first switch valve is controlled by control pressure fed through the first port and supplies operating pressure from the pressure control valve to a second clutch in first, second, third and fourth speeds; and is controlled by pressure control pressure fed through the second and third ports in the low L range and supplies operating pressure from the first pressure control valve to the first brake, thereby preventing hydraulic pressure from being supplied to both the second clutch and the first brake simultaneously.

The second switch valve:
supplies hydraulic pressure from the third pressure control valve to a fourth clutch valve and supplied N–D range pressure from the manual valve to a first clutch in second, third and fourth speeds;

is controlled by an on/off solenoid valve and supplies line pressure to the fourth clutch in neutral N, parking P and reverse R ranges; and supplies D range pressure from the manual valve to the fourth clutch and at the same time hydraulic pressure from the first pressure control valve to the first clutch.

The second switch valve is provided with a first port for receiving D range pressure from the manual valve, a second port for receiving control pressure from the on/off solenoid valve, a third port for receiving hydraulic pressure from the third pressure control valve, a fourth port for receiving line pressure, a fifth port for supplying the hydraulic pressure fed through the third port to the first clutch, a sixth port for supplying the hydraulic pressure fed through the first port to the first clutch, a seventh port for supplying hydraulic pressure fed through the fourth port the fourth clutch, an eighth port for supplying hydraulic pressure fed through the third port to the fourth clutch, and first and second exhaust ports for exhausting hydraulic pressure returning to the fifth, sixth, seventh, and eighth ports, the ports of the second switch valve being controlled by a valve spool installed in the valve body, the valve spool comprising first and second lands for selectively communicating the first port with the sixth port according to control pressure fed through the first port, a third land for selectively communicating the third port with the fifth port, a fourth land for selectively communicating the third port with the eighth port, a fifth land for selectively communicating the fourth port with the seventh port, and a sixth land on which the control pressure fed through the second port acts.

Fluid lines respectively connected to the fifth and sixth ports communicate with the first clutch through a first shuttle valve, and a first branch line branched off from a downstream side of the first shuttle valve is connected to a second branch line branched off from an upstream side of the first port via the first check valve which prevents fluid from flowing in a reverse direction.

A third branch line branched off from the second branch line is connected to the first and second fail-safe valves through a second check valve.

Fluid lines extended from the seventh and eighth ports are connected to the fourth clutch through a second shuttle valve, and a branch line branched off from a downstream side of the second shuttle valve is connected to the second fail-safe valve to supply control pressure to the second fail-safe valve.

The first fail-safe valve:
is controlled by the pressure and supplies hydraulic pressure from the first switch valve to the first brake in neutral N, parking P and low L ranges; and supplies R range pressure from a reverse R range line to the first brake.

The first fail-safe valve is provided with a first port for receiving hydraulic pressure being directed to the second clutch as control pressure, a second port for receiving hydraulic pressure being directed to the second brake as control pressure, a third port for receiving line pressure as control pressure, a fourth port for receiving hydraulic pressure from the R range pressure line and the first switch valve through a third shuttle valve, and a fifth port for supplying hydraulic pressure fed through the fourth port to the third clutch, the ports of the first fail-safe valve being controlled by a valve spool installed in the valve body, the valve spool comprising a first land on which control pressure fed through the first port acts, a second land on which control pressure fed through the second port acts, a third land for selectively communicating the fourth port with the fifth port, a fourth land for selectively communicating the fourth port with the fifth port together with the third land, and a fifth land on which control pressure fed through the third port acts.

The second fail-safe valve is designed to supply hydraulic pressure from the second pressure control valve to the second brake in second and fourth speeds.

The second fail-safe valve is provided with a first port for receiving R range pressure as control pressure, a second port for receiving part of hydraulic pressure being directed to the fourth brake as control pressure, a third port for receiving part of hydraulic pressure being directed to the second clutch as control pressure, a fourth port for receiving N–D range pressure as control pressure, and a fifth port for receiving hydraulic pressure from the second pressure control valve, and a sixth port supplying hydraulic pressure fed through the fifth port to the second brake, the ports of the second fail-safe valve being controlled by a valve spool installed in the valve body, the valve spool comprising a first land on which control pressure fed through the first port acts, a second land on which control pressure fed through the second port acts, a third land on which control pressure fed through the third port acts, a fourth land for selectively communicating the fifth port with the sixth port, a fifth land for selectively communicating the fifth port with the sixth port together with the fourth land, and a sixth land on which control pressure fed through the fourth port acts.

The N–R control valve is controlled by control pressure fed from the second solenoid valve, and supplies hydraulic pressure from the manual valve to the third clutch in a reverse R range.

The N–R control valve is provided with a first port for receiving control pressure of the second solenoid valve, a second port connected to an R range pressure line, and a third port for supplying hydraulic pressure fed through the second port to the third clutch, the ports of the N–R control valve being controlled by a valve spool installed in the valve body, the valve spool comprising a first land on which hydraulic pressure fed through the first port acts, and a second land for selectively opening and closing the second and third ports, an elastic member being disposed between the second land and the valve body to bias the valve spool.

A branch line branched off from a downstream side of the third port is connected to the R range pressure line via a third check valve.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is an operation chart of friction elements of the powertrain depicted in FIG. 1;

DETAILED DESCRIPTION OF THE PREFERRED EMBODIMENTS

A preferred embodiment of the present invention will now be described in detail with reference to the accompanying drawings.

Figure 1:
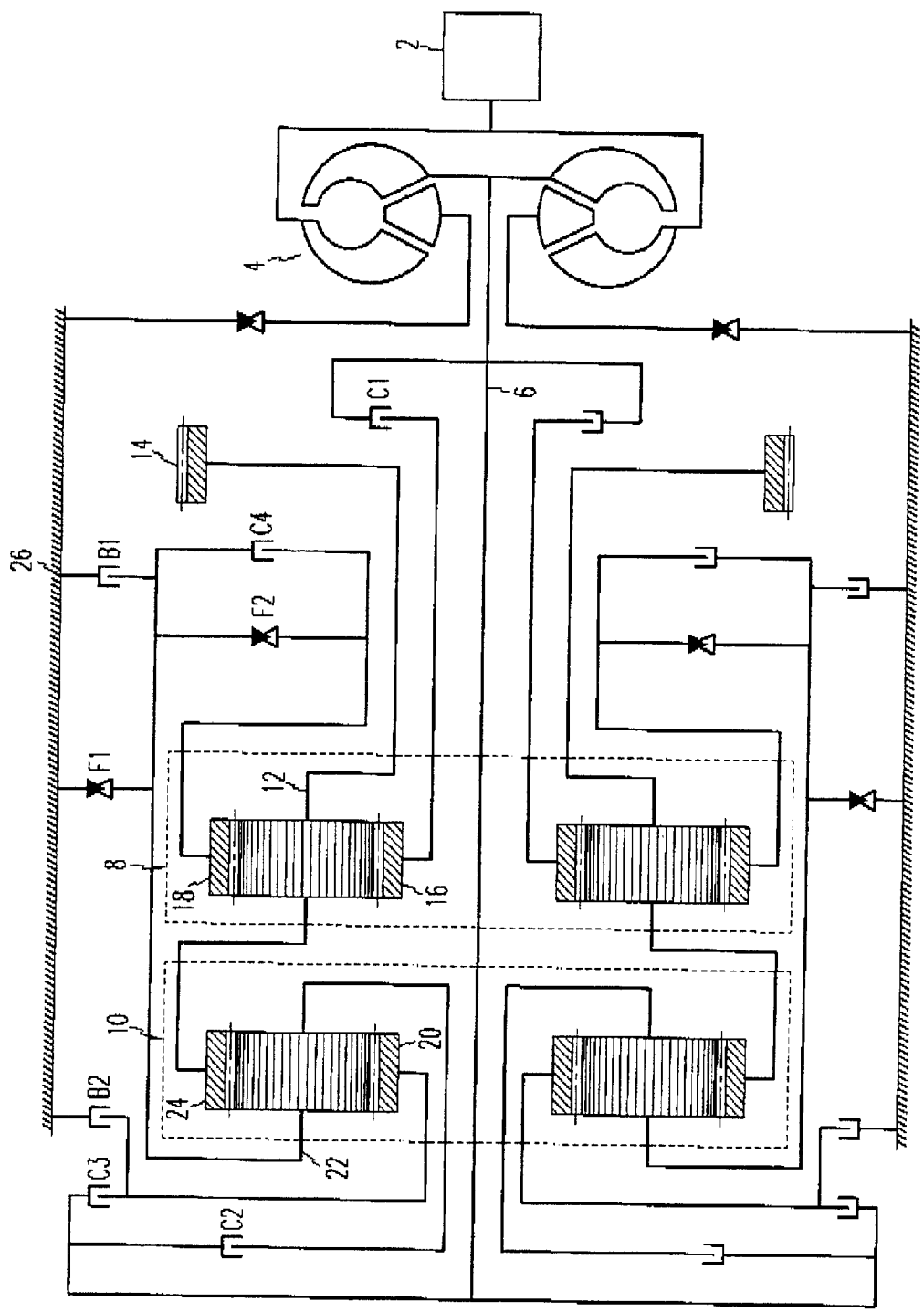
FIG. 1 is a schematic diagram of a powertrain which may be associated with a hydraulic control system according to a preferred embodiment of the present invention.

FIG. 1 shows a powertrain that can be associated with a hydraulic control system according to a preferred embodiment of the present invention.

When rotational power is transmitted from an engine 2 to an input shaft 6 through a torque converter 4, the input shaft 6 transmits torque to first and second single pinion planetary gear sets 8 and 10, and the shifting operation is realized while the torque is output to the transfer drive gear 14 through the first and second single pinion planetary gear sets 8 and 10. The transfer drive gear 14 is connected to a first planet carrier 12 of the first single pinion planetary gear set 8.

The first single pinion planetary gear set 8 includes a first sun gear 16, a first planet carrier 12, and a first ring gear 18, and the second single pinion planetary gear set 10 includes a second sun gear 20, a second planet carrier 22, and a second ring gear 24.

In the combination of the first and second single pinion planetary gear sets 8 and 10, the first planet carrier 12 is fixedly connected to the second ring gear 24, and the first sun gear 16 is variably connected to the input shaft 6 by a first friction element C1.

In addition, the second planet carrier 22 is variably connected to the input shaft 6 by a second clutch C2. The second sun gear 20 is connected to the input shaft 6 by a third clutch C3 that is operated in a reverse range.

The second planet carrier 22 is connected to a transmission housing 26 through a first brake B1 and a first one-way clutch F1 which are arranged in parallel, and is further connected to the first ring gear 18 through a fourth clutch C4 and a second one-way clutch F2 that are arranged in parallel.

The second sun gear 20 is connected to the transmission housing 26 by a second brake B2.

In a first speed of a drive D range, the first and fourth clutches C1 and C4 and the first and second one-way clutches F1 and F2 are operated such that the first sun gear 16 is operated as an input element and the first ring gear 18 and the second planet carrier 22 are operated as reacting elements.

In a second speed of the drive D range, the second brake B2 is additionally operated such that the second sun gear 20 is operated as a reacting element in a state where the first sun gear 16 is operated as an input element.

In a third speed of the drive D range, the second clutch C2 is additional operated, and the second brake B2 is released, such that the first and second single pinion planetary gear sets 8 and 10 are locked to each other, as a result of which the input becomes identical to the output.

In a fourth speed of the drive D range, the second brake B2 is further operated such that the second sun gear 20 becomes a reacting element, thereby realizing the fourth speed which is an overdrive state.

Figure 3:
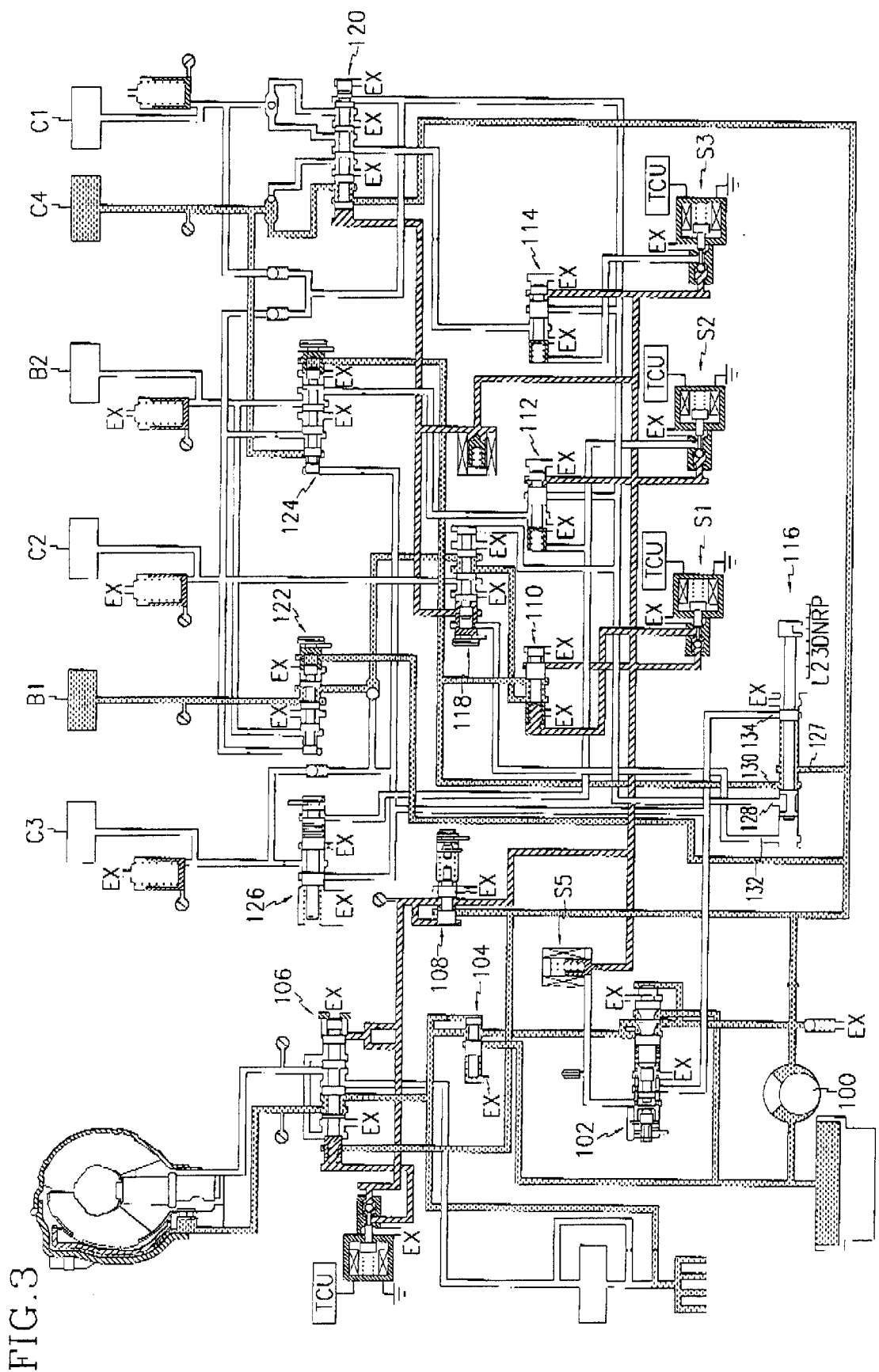
FIG. 3 is a hydraulic circuit diagram illustrating hydraulic flow in a neutral N range in a hydraulic control system according to a preferred embodiment of the present invention.

FIG. 3 shows a hydraulic control system according to a preferred embodiment of the present invention. The frictions elements C1, C2, C3, C4, B1 and B2 are controlled by the hydraulic control system.

The hydraulic circuit diagram depicted in FIG. 3 shows a hydraulic flow in a neutral N range.

When the torque converter 4, which converts torque from the engine and transmits the converted torque to the transmission is operated, a fluid pump 100 is operated to generate fluid for forming hydraulic pressure required for controlling the torque converter and the shift operation, as well as fluid which is used as a lubricant. The hydraulic pressure formed by the fluid generated by the fluid pump 100 is supplied to a pressure regulating and damper clutch control part and a pressure reducing part, and at the same time, to a hydraulic control part through a manual/automatic shift control part, thereby being controlled to be appropriate for the shifting operation. The control pressure is supplied to the friction elements as operation pressure through a switching part and a fail-safe part. In a reverse range, the hydraulic pressure is supplied from the manual/automatic shift control part to the friction elements through an N–R control part.

The pressure regulating and damper clutch control part includes a regulator valve 102 for regulating the hydraulic pressure from the fluid pump 100 as constant pressure, a torque converter control valve 104 for regulating hydraulic pressure fed from the regulator valve 102 as torque converter operating and lubricating fluid, and a damper clutch control valve 106 for controlling a damper clutch to improve the power transmission efficiency.

The pressure reducing part includes a reducing valve 108 for reducing hydraulic pressure to lower than line pressure. Part of the hydraulic pressure reduced by the reducing valve 108 is fed to the damper clutch control valve 106 and the regulator valve 102 as control pressure.

Part of the hydraulic pressure reduced by the reducing valve 108 is supplied to first, second, and third pressure control valves 110, 112 and 114 for forming shift control pressure and to the pressure control part having first, second and third solenoid valves S1, S2 and S3.

The shift control part for forming the manual/automatic shift mode includes a manual valve 116 operated in accordance with the operation of a shift selector lever. The hydraulic pressure fed to the manual valve 116 is, according to the range selection, supplied to the pressure control part or first and second switch valves 118 and 120 of the switching part, first and second fail-safe valves 122 and 124 of the fail-safe part, the N–R control valve 126 of the N–R control part as control pressure, or to the friction elements as operation pressure.

In the above described hydraulic control system, the manual valve 116 receives hydraulic pressure from the line pressure line 127 connected to the regulator valve 102 and supplies hydraulic pressure to an N–D range pressure line 130, a D range pressure line 128, an L range pressure line 132, and an R range pressure line 134 to perform the manual shift.

The N–D range pressure line 130 is connected to the first pressure control valve 110 and to the second fail-safe valve 124. The D range pressure line 128 is directed to the second and third pressure control valves 112 and 114 and to the first and second switch valves 118 and 120. The L range pressure line 132 is directed to the first switch valve 118, and the R range pressure line 134 is directed to the regulator valve 102 and the N–R control valve 126.

Figure 4:
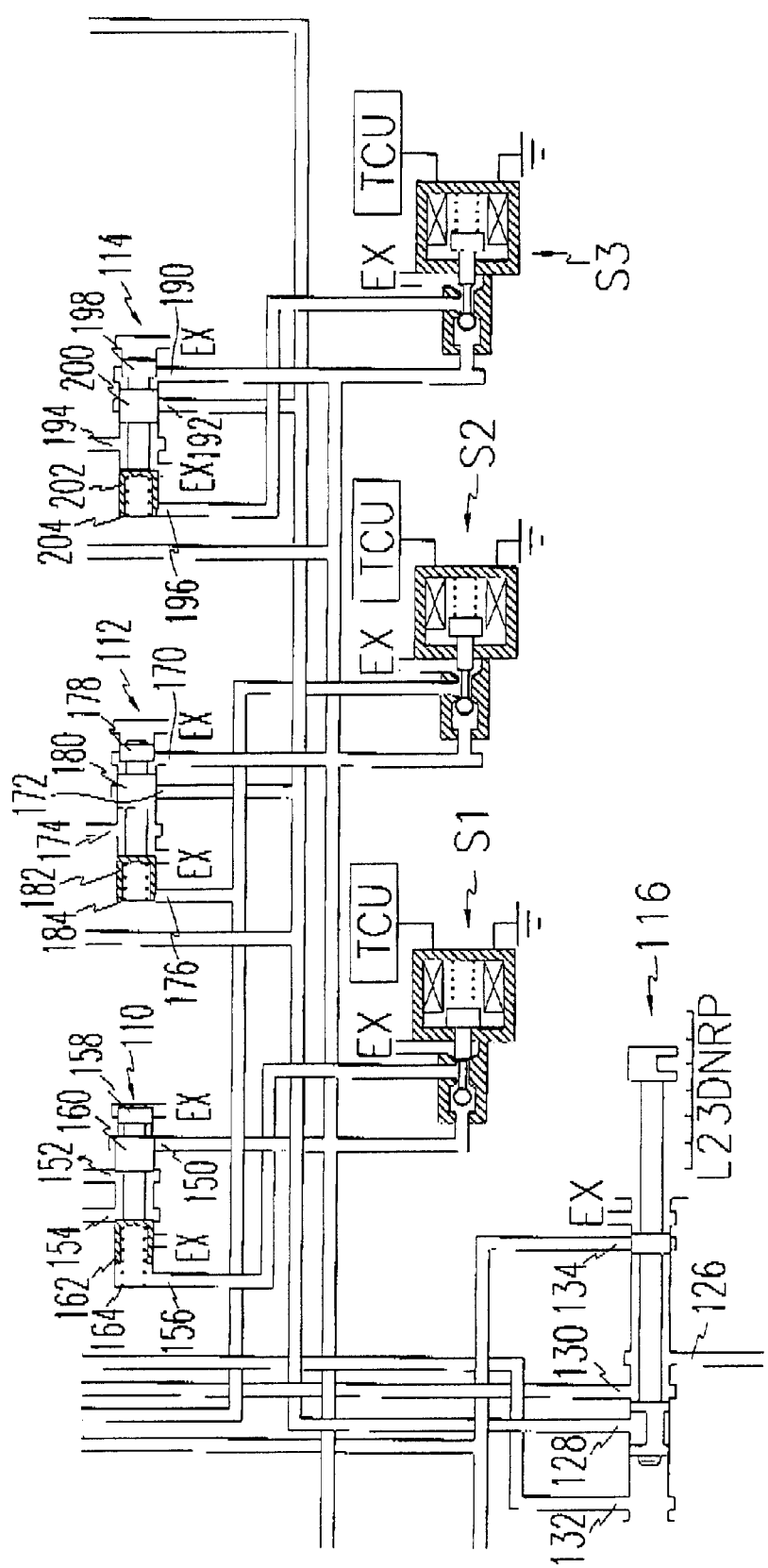
FIG. 4 is an enlarged hydraulic circuit diagram of a hydraulic control part of a hydraulic control system according to a preferred embodiment of the present invention.

In addition, as shown in FIG. 4, the first pressure control valve 110 is provided with a first port 150 for receiving reduced pressure from the reducing valve 108, a second port 152 for receiving hydraulic pressure from the manual valve 116, a third port 154 for supplying the hydraulic pressure fed through the second port 152 to the first switch valve 118, and a fourth port 156 for receiving control pressure from the first solenoid valve S1.

The ports of the first pressure control valve 110 are opened/closed according to a valve spool installed in a valve body defining the ports. The valve spool comprises a first land 158 on which the hydraulic pressure fed through the first port 150 acts, a second land 160 on which the hydraulic pressure fed through the first port 150 acts to open and close the second port 152, and a third land 162 for selectively communicating the second port 152 with the third port 154 together with the second land 160. Disposed between the valve body and the third land 162 is an elastic member 164 for biasing the valve spool leftward in the drawing.

The first solenoid valve S1 for controlling the first pressure control valve 110 is a 3-way valve. When the first solenoid valve S1 is controlled to an On-state, the supply of the hydraulic pressure is interrupted and the hydraulic pressure fed to the first pressure control valve 110 as control pressure is exhausted. When the second solenoid valve S2 is controlled to an Off-state, the exhaust port is blocked, and the reduced pressure is fed to the first pressure control valve 110.

Accordingly, when the first solenoid valve S1 is turned On, since the supply of the control pressure to the fourth port 156 is interrupted, the valve spool of the first pressure control valve 110 is moved leftward by the reducing pressure fed through the first port 150, thereby blocking the second port 152. When the first solenoid valve S1 is turned off, control pressure is fed to the first pressure control valve 110 through the fourth port 156 to move the valve spool rightward, thereby communicating the second port 152 with the third port 154 to supply hydraulic pressure to the first switch valve 118.

The second pressure control valve 112 is provided with a first port 170 for receiving the reduced pressure from the reducing valve 108, a second port 172 for receiving hydraulic pressure from the manual valve 116, a third port 174 for supplying the hydraulic pressure fed through the second port 172 to the second fail-safe valve 124, and a fourth port 176 for receiving control pressure from the second solenoid valve S2.

A valve spool installed in the valve body controls the ports of the second pressure control valve 112. The valve spool of the second pressure control valve 112 comprises a first land 178 on which hydraulic pressure fed through the first port acts, a second land 180 on which hydraulic pressure fed through the first port 170 acts to selectively open and close the second port 172, and a third land 182 for selectively communicating the second port 172 with the third port 174 together with the second land. Disposed between the third land 182 and the valve body is an elastic member 184 for biasing the valve spool rightward.

When the second solenoid valve S2 is controlled to an On-state, since the supply of the control pressure to the fourth port 176 is interrupted, the valve spool is moved leftward by the reducing pressure fed through the first port 170, thereby blocking the second port 172. When the second solenoid valve S2 is controlled to an Off-state, the control pressure is supplied to the fourth port 176 to move the valve spool rightward, thereby communicating the second port 172 with the third port 174, thereby supplying hydraulic pressure to the second fail-safe valve 124.

The third pressure control valve 11 is provided with a first port 190 for receiving reduced pressure from the reducing valve 108, a second port 192 for receiving hydraulic pressure from the manual valve 116, a third port 194 for supplying the hydraulic pressure fed through the second port 192 to the second switch valve 120, and a fourth port 196 far receiving control pressure from the third solenoid valve S3.

A valve spool installed in the valve body controls the ports of the third pressure control valve 11.

The valve spool comprises a first land 198 on which the hydraulic pressure fed through the first port act, a second land 200 on which the hydraulic pressure fed through the first part 190 acts to selectively open and close the second port; and a third land 202 for selectively communicating the second port 192 with the third port 194. Disposed between the valve body and the third land 202 is an elastic member 204 for biasing the valve spool rightward.

When the third solenoid valve S3 is turned On, the valve spool of the third pressure control valve 114 is moved leftward to block the second port 192, and when turned Off, the valve spool is moved rightward by the control pressure to communicate the second part 192 with the third port 194, thereby supplying the hydraulic pressure from the manual valve 116 to the second switch valve 120.

Figure 5:
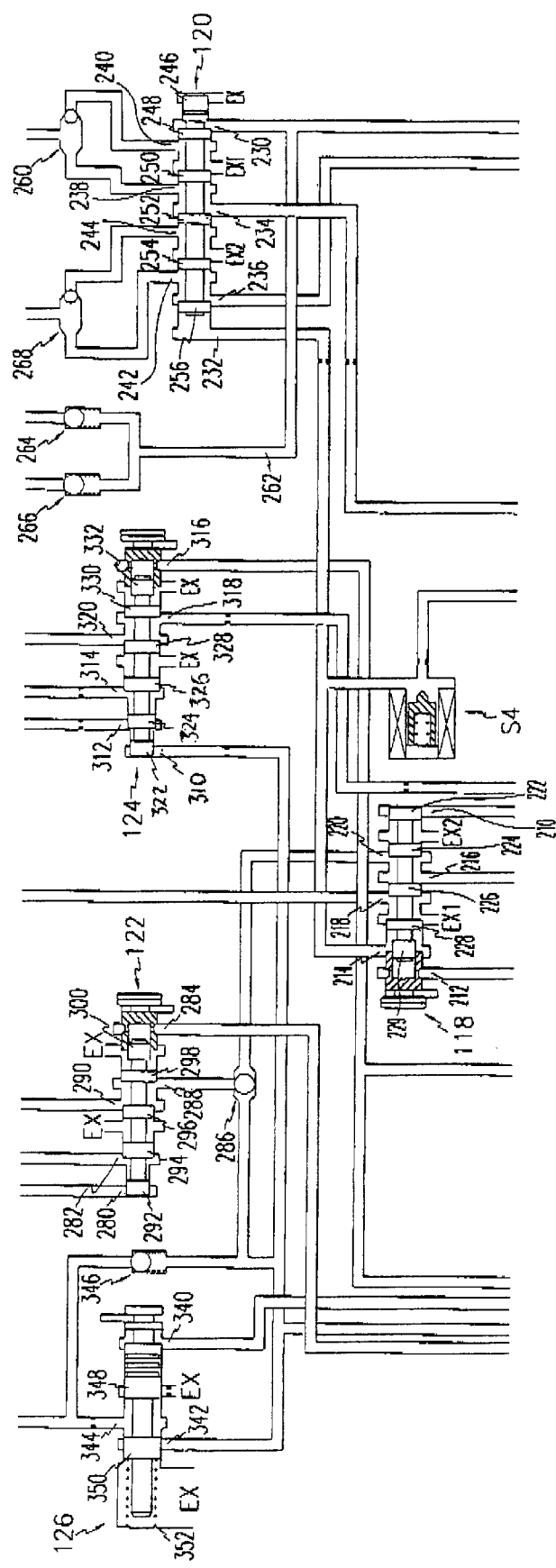
FIG. 5 is an enlarged hydraulic circuit diagram of a switching part, a fail-safe part, an N–R control part and a hydraulic distributing part of a hydraulic control system according to a preferred embodiment of the present invention.

As shown in FIG. 5, the first and second switch valves 118 and 120 perform their port conversion according to control pressure fed from the solenoid valve S4 controlling hydraulic pressure from both the manual valve 116 and the reducing valve 108. The first switch valve 118 selectively supplies the N-D range pressure fed from the first pressure control valve 110 to the second clutch C2 and to the first brake B1 through the first fail-safe valve 122.

The first switch valve 118 is provided with a first part 210 for receiving the N-D range pressure from the manual valve 116 as control pressure, a second port 212 far receiving L range pressure from the manual valve 116 as control pressure, a third port 214 for receiving control pressure from the on/off solenoid valve S4, a fourth port 216 for receiving hydraulic pressure from the first pressure control valve 110, a fifth port 218 for supplying hydraulic pressure fed through the fourth port 216 to the second clutch C2 and the first and second fail-safe valves 122 and 124 as control pressure, a sixth port 224 for supplying hydraulic pressure fed through the fourth port 216 to the first fail-safe valve 122, and first and second exhaust ports EX1 and EX2 for exhausting hydraulic pressure returning to the fifth and sixth ports 218 and 220, The ports of the first switch valve 118 are controlled by a valve spool installed in the valve body. The valve spool comprises a first land 222 on which control pressure fed through the first port 210 acts, a second land 224 for selectively communicating the fourth port 218 with the sixth port 220, a third land 226 far selectively communicating the fourth port 216 with the fifth port 218, a fourth land 228 on which control pressure fed through the third port 214 acts, and a fifth land 229 on which control pressure fed through the second port 212 acts.

Accordingly, the first switch valve 118 is controlled by the control pressure fed through the first port 210 in first, second, third and fourth forward speeds, and supplies operating pressure from the first pressure control valve 110 to the second clutch C2 in the third and fourth forward speeds. In the L range, the first switch valve 118 is controlled by control pressure fed through the second and third ports 212 and 214 and supplies operating pressure from the first pressure control valve 110 to the first brake B1 while preventing operating pressure from being supplied to the second clutch C2 and the first brake B1 simultaneously.

The second switch valve 120 is provided with a first port 230 for receiving D range pressure from the manual valve 116, a second port 232 for receiving control pressure from the on/off solenoid valve S4, a third port 234 for receiving hydraulic pressure from the third pressure control valve 114, a fourth port 236 for receiving line pressure, a fifth port 238 for supplying the hydraulic pressure fed through the third port 234 to the first clutch C1, a sixth port 240 for supplying the hydraulic pressure fed through the first port 230 to the first clutch, a seventh part 242 for supplying hydraulic pressure fed through the fourth port 236 to the fourth clutch C4, an eighth port 244 for supplying hydraulic pressure fed through the third port 234 to the fourth clutch C4, and first and second exhaust ports EX1 and EX2 for exhausting hydraulic pressure returning to the fifth, sixth, seventh, and eighth ports 238, 240, 242, and 244.

A valve spool installed in the valve body controls the ports of the second switch valve 120. The valve spool comprises first and second sands 246 end 248 for selectively communicating the first port 230 with the sixth port 240 according to control pressure fed through the first port 230, a third land 250 for selectively communicating the third port 234 with the fifth port 238, a fourth land 252 for selectively communicating the third port 234 with the eighth port 244, a fifth land 254 for selectively communicating the fourth port 236 with the seventh port 242, and a sixth land 256 on which the control pressure fed through the second port 232 acts.

Fluid lines extended from the fifth and sixth ports 238 and 240 are connected to the first clutch C1 via a first shuttle valve 260, and a branch line branched off from a downstream side of the first shuttle valve 260 is connected to a branch line 262 branched off from an upstream side of the first port 230 via the first check valve 264 which prevents fluid from flowing in a reverse direction.

In addition, a branch line branched off from the branch line 282 is connected to the first and second fail-safe valves 122 and 124 through a second check valve 266.

Fluid lines extended from the seventh and eighth ports 242 and 244 are connected to the fourth clutch C4 through a second shuttle valve 268. A branch line branched off from a downstream side of the second shuttle valve 268 is connected to the second fail-safe valve 124 to supply control pressure to the second fail-safe valve 124.

The first and second check valves 284 and 266 are provided to quickly exhaust hydraulic pressure when a manual shift from the D range to the N range is performed, and the first and second shuttle valves 280 and 288 are designed to block fluid passage according to a flow direction of hydraulic pressure to the first and fourth clutches C1 and C4.

Accordingly, the second switch valve 120 supplies hydraulic pressure from the third pressure control valve 114 to the fourth clutch C4 in the second, third and fourth speeds while supplying N-D range pressure from the manual valve 116 to the first clutch S4. In the N, P and R ranges, the second switch valve 120 is controlled by the on/off solenoid valve S4 and supplies line pressure to the fourth clutch C4. In the L range, the second switch valve 120 supplies D range pressure from the manual valve 116 to the fourth clutch C4 and supplies hydraulic pressure from the first pressure control valve 114 to the first clutch C7.

The first and second fail-safe valves 122 and 124 are provided to prevent the first and second brakes B1 and B2 from operating simultaneously. The first fail-safe valve 122 is, as shown in FIG. 5, provided with a first port 280 for receiving hydraulic pressure being directed to the second clutch C2 as control pressure, a second port 282 for receiving hydraulic pressure being directed to the second brake B2 as control pressure, a third port 284 for receiving line pressure as control pressure, a fourth port 288 for receiving hydraulic pressure from the R range pressure line 134 and the first switch valve 118 through a third shuttle valve 286, and a fifth port 294 for supplying hydraulic pressure fed through the fourth port 288 to the third clutch C3.

A valve spool installed in the valve body controls the ports of the first fail-safe valve. The valve spool comprises a first land 292 on which control pressure fed through the first port 280 acts, a second land 294 on which control pressure fed through the second port 282 acts, a third land 296 for selectively communication the fourth port 288 with the fifth port 290, a fourth land 298 for selectively communicating the fourth port 288 with the fifth port 290 together with the third land 296, and a fifth land 300 on which control pressure fed through the third port 284 acts.

Accordingly, the first fail-safe valve 122 is controlled by line pressure in the N, P and L range and supplies hydraulic pressure from the first switch valve 118 to the first brake B1. In the R range, the first fail-safe valve 122 supplies hydraulic pressure from the R range pressure line 134 to the first brake B1.

The second fail-safe valve 124 is provided with a first port 310 for receiving R range pressure as control pressure, a second port 312 for receiving part of the hydraulic pressure being directed to the fourth brake C4 as control pressure, a third part 314 for receiving part of the hydraulic pressure being directed to the second clutch C2 as control pressure, a fourth part 316 for receiving N-D range pressure as control pressure, a fifth port 318 for receiving hydraulic pressure from the second pressure control valve 112, and a sixth port 320 supplying hydraulic pressure fed through the fifth port 318 to the second brake B2.

The ports of the second fail-safe valve 124 are controlled by a valve spool installed in the valve body. The valve spool comprises a first land 322 on which control pressure fed through the first port 310 acts, a second land 324 on which control pressure fed through the second port 312 acts, a third land 326 on which control pressure fed through the third part 314 acts, a fourth land 328 for selectively communicating the fifth port 318 with the sixth port 320, a fifth land 330 for selectively communicating the fifth, port 318 with the sixth port 320 together with the fourth land 328, and a sixth land 332 on which control pressure fed through the fourth port 316 acts.

Accordingly, the second fail-safe valve 124 Supplies hydraulic pressure from the second pressure control valve 112 to the second brake B2.

As Shown in FIG. 5, the N-R control valve 126 for alleviating shift shock during an N-R manual shifting is provided with a first port 340 for receiving control pressure of the second solenoid valve S2, a second port 342 connected to the R range pressure line 134, and a third port 344 for supplying hydraulic pressure fed through the second port 342 to the third clutch C3. A branch line branched off from a downstream side of the third port 344 is connected to the R range pressure fine 134 via a third check valve 346.

The third check valve 346 is provided to prevent hydraulic pressure from flowing in a reverse direction and to quickly exhaust hydraulic pressure which has been supplied to the third clutch C3.

In addition, a valve spool installed in the valve body controls the ports of the N-R control valve 126. The valve spool comprises a first land 348 on which hydraulic pressure fed through the first port 340 acts, and a second land 350 for selectively opening and dosing the second and third parts 340 and 342. Disposed between the second land 350 and the valve body is an elastic member 352 for biasing the valve spool rightward in the drawing.

Accordingly, the N-R control valve 126 is controlled by control pressure supplied from the second solenoid valve S24 in the R range, and slowly supplies hydraulic pressure from the manual valve 116 to the third clutch C3, thereby alleviating the shift shock.

As shown in FIG. 3, the line pressure variation is realized by supplying hydraulic pressure from the reducing valve 108 to the regulator valve 102 as control pressure. A duty-controlled solenoid valve S5 is disposed between the reducing valve 108 and the regulator valve 102 such that the line pressure is varied by controlling the solenoid valve S5 according to the driving condition, thereby reducing the driving loss of the fluid pump 100 by preventing the line pressure from being excessively increased. This results in improving the fuel consumption ratio.

In the neutral N range, as shown in FIG. 3, hydraulic pressure generated from the fluid pump 100 is regulated by the regulator valve 102 to be constant, then reduced by the reducing valve 108, and supplied to the first, second and third pressure control valves 110, 112 and 114 and the damper clutch control valve 106.

The line pressure is supplied to the first, second and third pressure control valves 110, 112 and 114, the second fail-safe valve 124, and the first fail-safe valve 122 through the manual valve 116 and the N-D range pressure line 130.

At this point, both the first solenoid valve S1 and the on/off solenoid valve S4 are controlled to an Off-state, and both the second and third solenoid valves S2 and S3 are controlled to an On-state, thereby operating the fourth clutch C4 and the first brake B1 to realize the N range as shown in FIG. 3.

Figure 6:
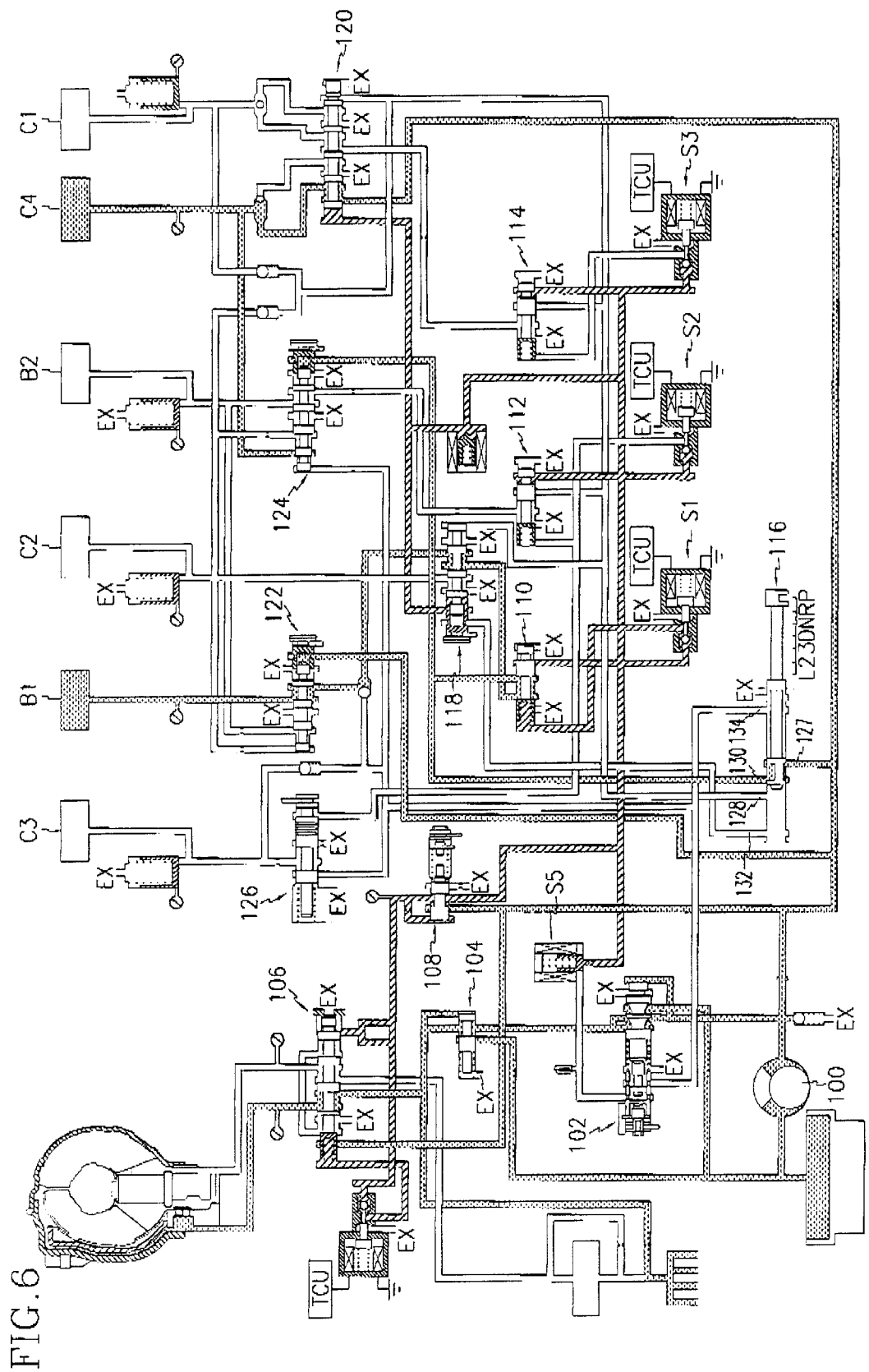
FIG. 6 is a hydraulic circuit diagram illustrating hydraulic flow in a parking P range in a hydraulic control system according to a preferred embodiment of the present invention.
Figure 7:
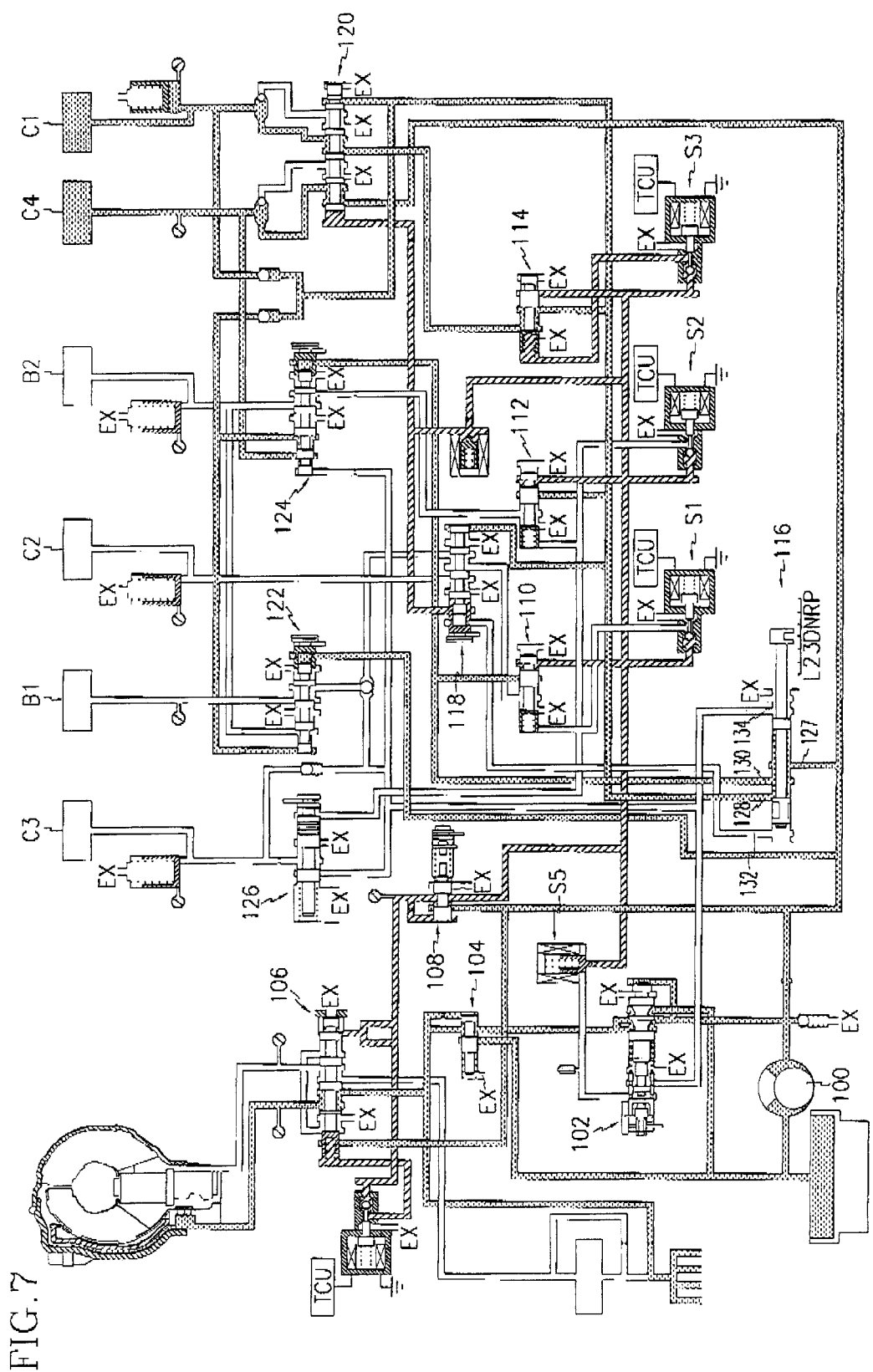
FIG. 7 is a hydraulic circuit diagram illustrating hydraulic flow in a first speed of a drive D range in a hydraulic control system according to a preferred embodiment of the present invention.

In the parking P range, as shown in FIG. 6, the flow of the hydraulic pressure is identical to that in the N range but the position of the manual valve 116 is displaced. Accordingly, the fourth clutch C4 and the first brake B1 are operated to maintain the parking state.

In the first speed of the drive D range, the first solenoid valve S1 is controlled to an On-state, and the third solenoid valve S3 is controlled to an Off-state at the N range state.

Accordingly, hydraulic pressure which has been supplied to the first brake B1 is released, and hydraulic pressure which has been directed to the third pressure control valve 114 is supplied to the first clutch C1 via the second switch valve 120, thereby realizing the first speed by operating the first and fourth clutches C1 and C4.

In the first speed state, a neutral control is performed when the vehicle stops. At this paint, when it is detected that the vehicle is not moving, a foot brake is on, and a throttle is off, the transmission control unit controls the transmission to be maintained in the neutral state. In addition, by operating the first brake B1, when releasing the toot brake, the vehicle can be prevented from rolling downward on a slope. At this point, since the engine maintains the no-load state, the fuel consumption ratio can be improved.

Figure 8:
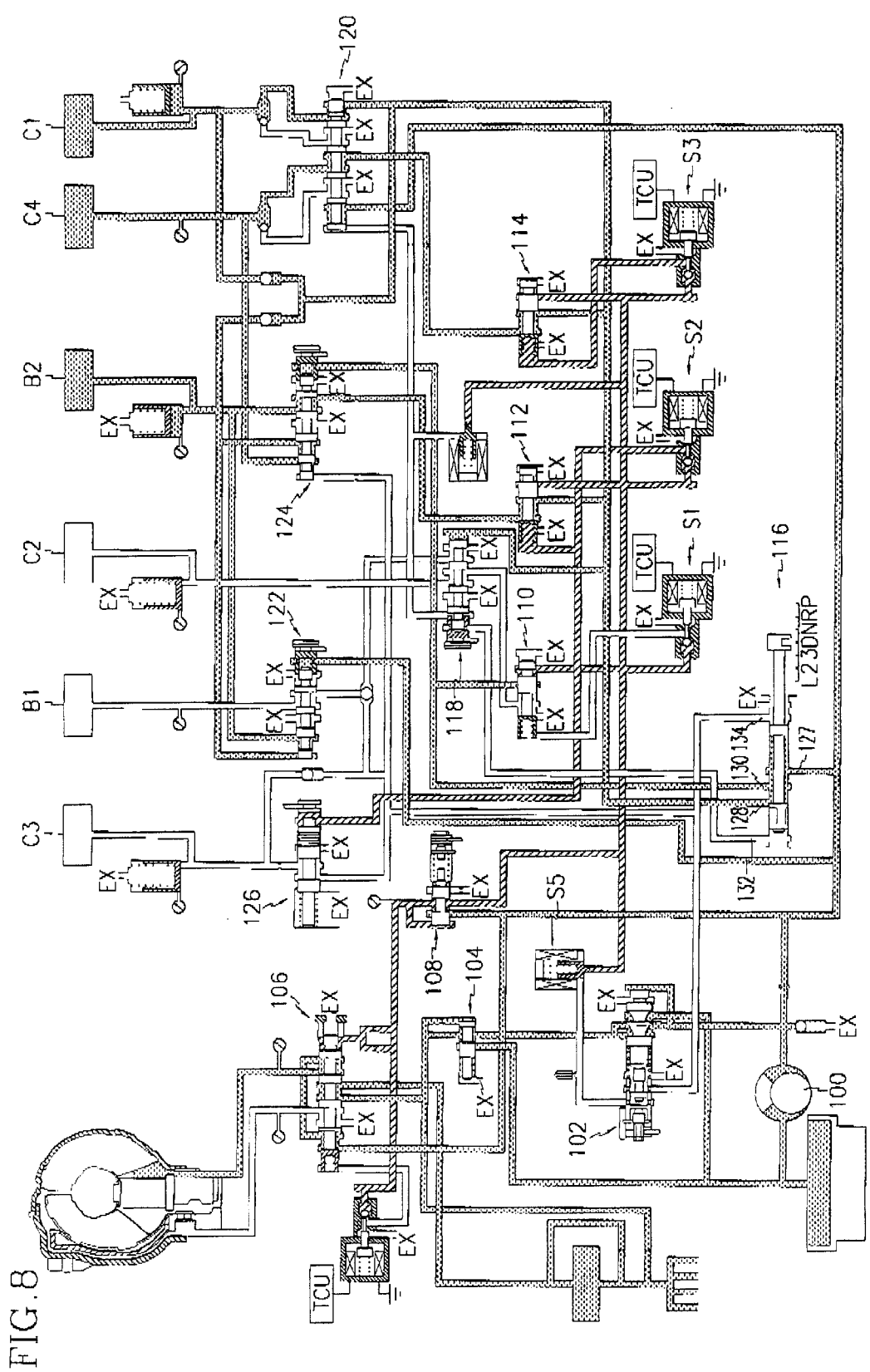
FIG. 8 is a hydraulic circuit diagram illustrating hydraulic flow in a second speed of a drive D range in a hydraulic control system according to a preferred embodiment of the present invention.

When the vehicle speed is increased in the first speed state, the opening of the throttle valve is increased, and the shifting to the second speed is performed. At this point, as shown in FIG. 8, the second solenoid valve S2 is controlled to an On-state and the on/off solenoid valve S4 is controlled to an On-state.

By controlling the on/off solenoid valve S4 to the On-state, the supply of control pressure to the second switch valve 120 is interrupted such that hydraulic pressure staying at the second switch valve 120 is supplied to the first clutch C1, and control pressure of the third pressure control valve 114 is supplied to the fourth clutch C4 via the second switch valve 120.

In addition, control pressure of the second pressure control valve 112 is supplied to the second brake B2 via the second fail-safe valve 124, thereby realizing the second speed.

Figure 9:
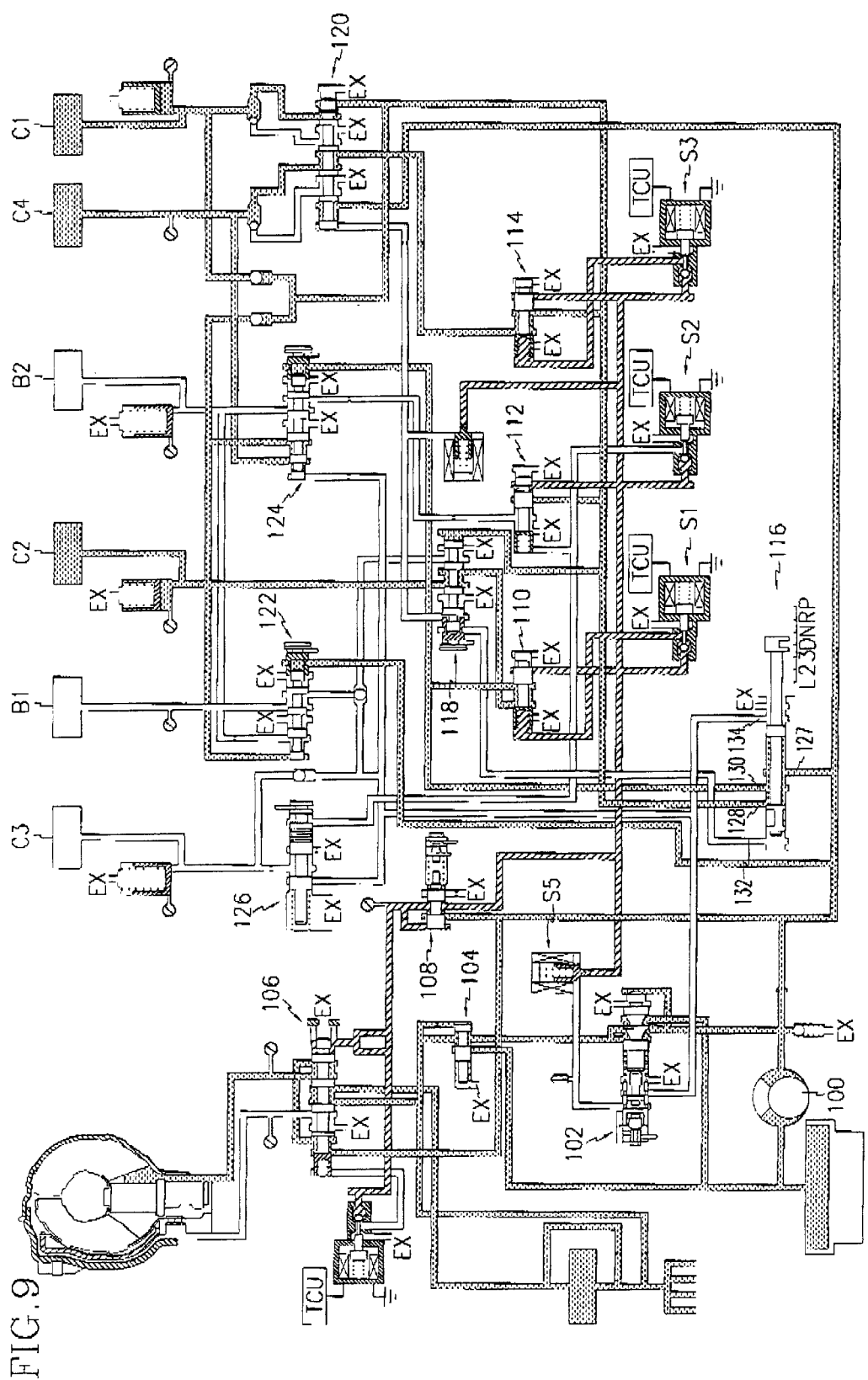
FIG. 9 is a hydraulic circuit diagram illustrating hydraulic flow in a third speed of a drive D range in a hydraulic control system according to a preferred embodiment of the present invention.

When the vehicle speed is further increased in the second speed control state and the opening of the throttle valve is increased, as shown in FIG. 9, the first solenoid valve S1 is controlled to an Off-state, and the second solenoid valve S2 is controlled to an On-state.

Accordingly, the supply of the hydraulic pressure to the second pressure control valve 112 is interrupted, thereby releasing the second brake B2. In addition, hydraulic pressure of the first pressure control valve 110 is supplied to the second clutch C2 through the first switch valve 118, thereby realizing the third speed.

Figure 10:
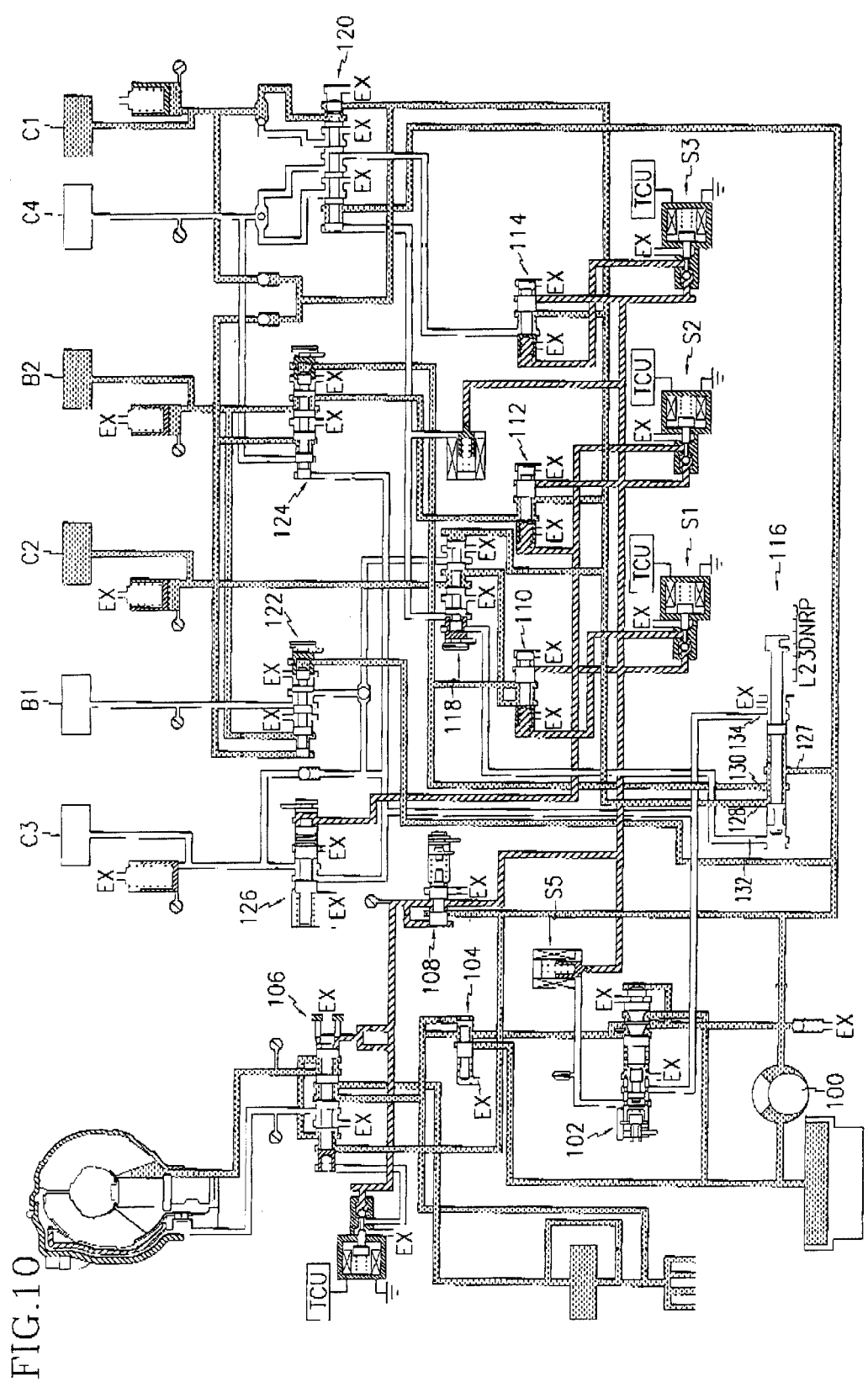
FIG. 10 is a hydraulic circuit diagram illustrating hydraulic flow in a fourth speed of a drive D range in a hydraulic control system according to a preferred embodiment of the present invention.

When the vehicle speed is further increased, in the third speed control state and the opening of the throttle valve is increased, as shown in FIG. 10, the second solenoid valve S2 is controlled to an Off-state, and the third solenoid valve S3 is controlled to an On-state.

By controlling the third solenoid valve S3 to the On-state, the hydraulic pressure is released from the fourth clutch C4, and by controlling the second solenoid valve S2 to the Off-state, hydraulic pressure is supplied to the second clutch C2 via the first switch valve 118, thereby realizing the fourth speed.

Figure 11:
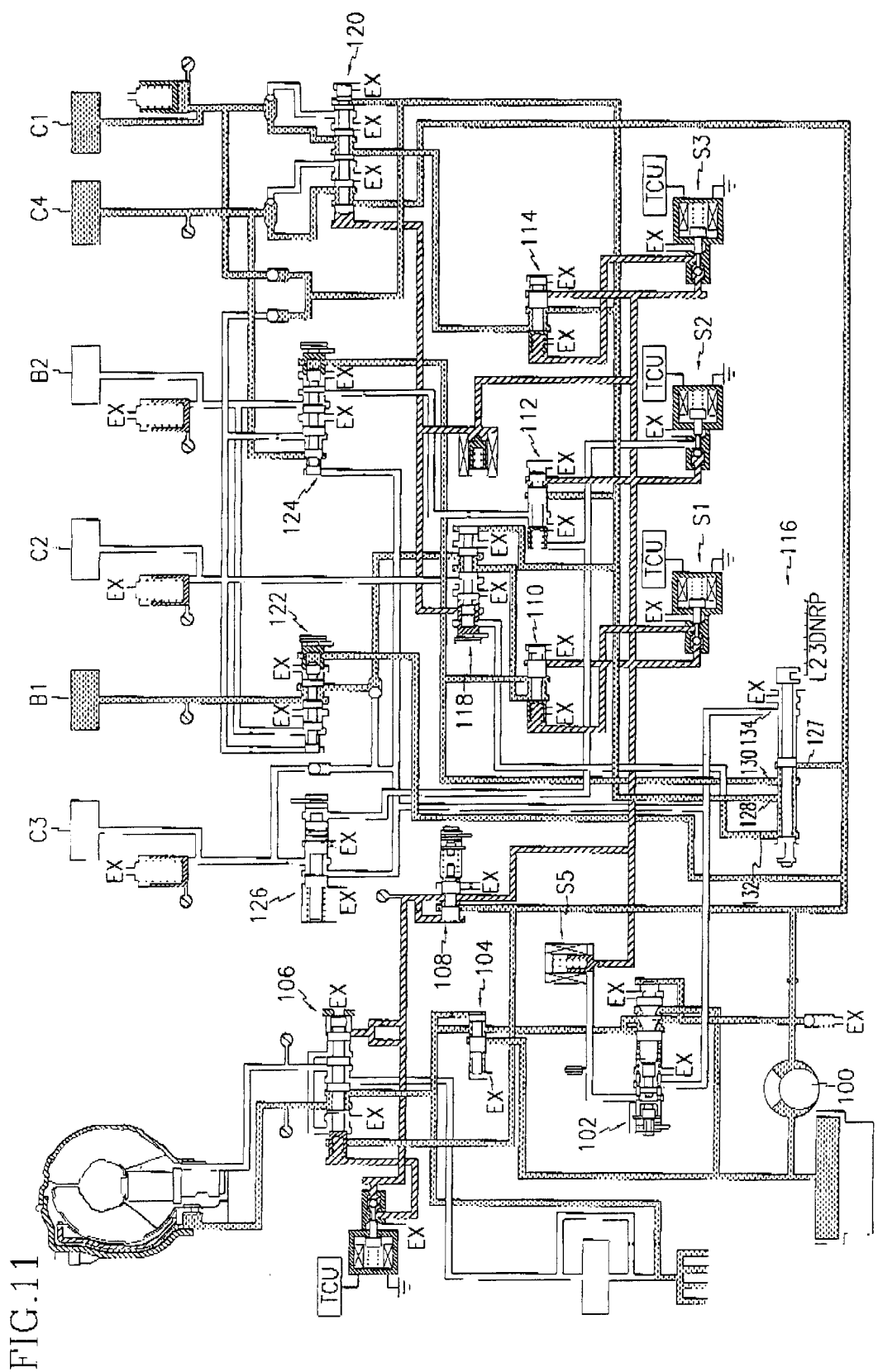
FIG. 11 is a hydraulic circuit diagram illustrating hydraulic flow in a drive D1 range in a hydraulic control system according to a preferred embodiment of the present invention.

In the first speed of the low L range, as shown in FIG. 11, the first solenoid valve S2 is controlled to an Off-state such that hydraulic pressure is supplied to the first brake B1 through the first switch valve 118 and the first fail safe valve 122, thereby realizing the first speed of the low L range by operating the first brake B1 and tine first and fourth clutches C1 and C4.

Figure 12:
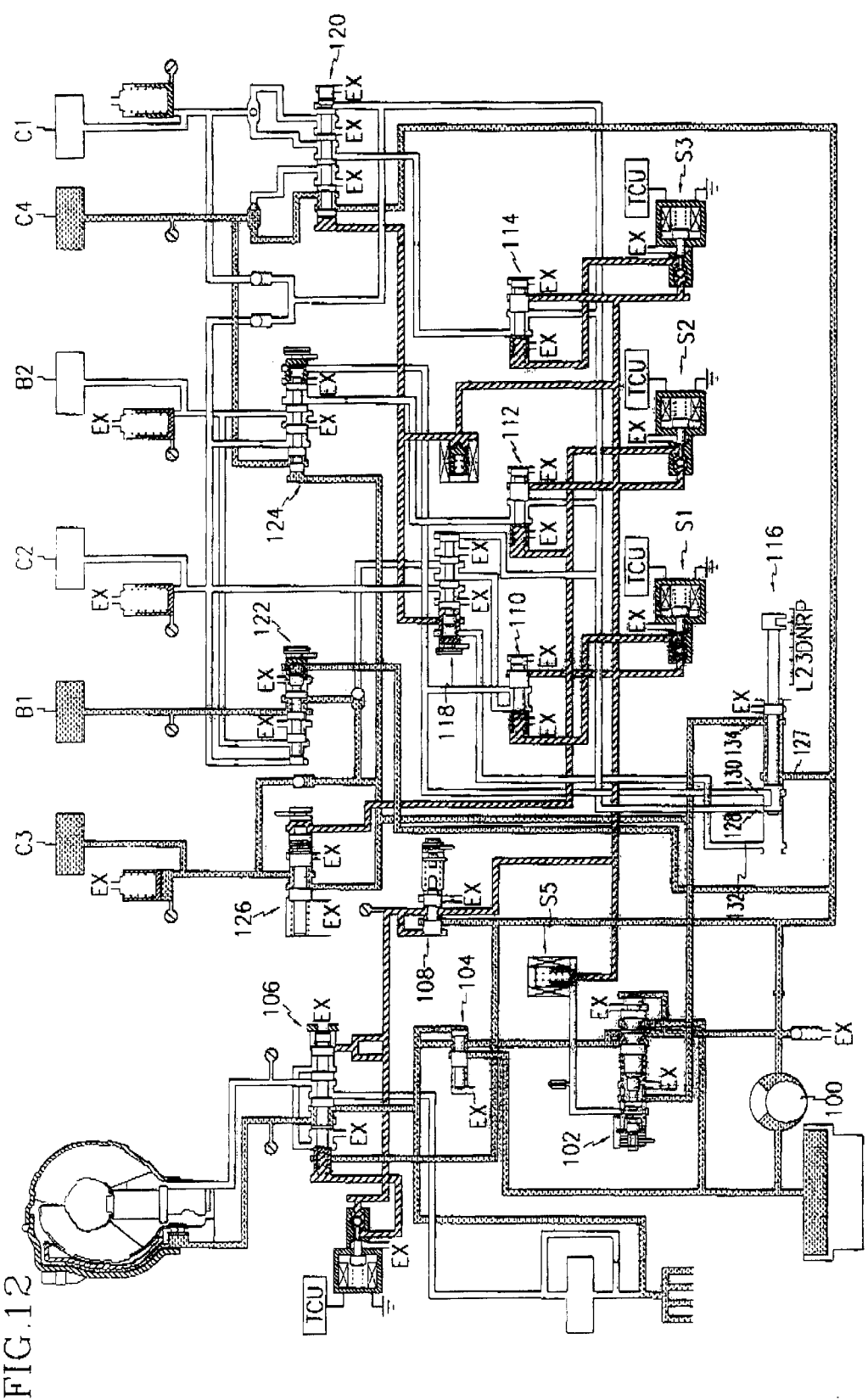
FIG. 12 is a hydraulic circuit diagram illustrating hydraulic flow in a reverse R range in a hydraulic control system according to a preferred embodiment of the present invention.

FIG. 12 shows a fluid flow in a reverse R range. In this range, all of the solenoid valves except for the first solenoid valve S1 are controlled to an Off-state.

Accordingly, hydraulic pressure in the line pressure line 127 is supplied to the fourth clutch C4 via the second switch valve 120, and by controlling the on/off solenoid valve S4 to an Off-state, the N-R control valve 126 is controlled such that hydraulic pressure in the R range pressure line 134 is supplied to the third clutch C3, thereby realizing the reverse R range.

As described above, since the N-R shift control is realized in a state where the rotation of the power train is prevented by operating the first brake B1, the shift shock caused by the operation of the first brake B1 can be alleviated.

In the above described hydraulic control system, since all of the friction element are independently controlled by a clutch-to-clutch control method and an indirect control method whereby a secondary control method is employed, a small amount of control pressure is required, allowing the use of small capacity solenoid valves to reduce the noise and vibration.

In addition, since a special line pressure regulating solenoid valve is employed, an optimal hydraulic pressure can be maintained. Since a neutral control in a stop state during driving is realized, the fuel consumption ratio is improved, Furthermore, during the N-R and N-D manual shifting, since a friction element for an input element is operated in a state where a friction element for a reacting element is operated, the shift shock can be minimized.

Although preferred embodiments of the present invention have been described in detail hereinabove, it should be clearly understood that many variations and/or modifications of the basic inventive, concepts herein taught which may appear to those skilled in the present art will still fall within the spirit and scope of the present invention, as defined in the appended claims.

What is claimed is:

1. A hydraulic control system for an automotive automatic transmissions comprising:

a pressure regulator for regulating hydraulic pressure generated by a fluid pump;

a pressure reducer having a reducing valve for reducing hydraulic pressure regulated by the pressure regulator;

a shift controller having a manual valve cooperating with a shift selector lever and connected to a plurality of range pressure lines;

a pressure controller comprising first, second and third solenoid valves for controlling control pressure reduced by the reducing valve, and first, second and third pressure control valves for controlling hydraulic pressure supplied from the manual valve, the first, second and third pressure control valves being independently controlled by control pressure supplied from the first, second and third solenoid valves, respectively;

a switching controller comprising a first switch valve for supplying hydraulic pressure from the first pressure control valve to one of first and second switching lines and a second switch valve for supplying hydraulic pressure from the third pressure control valve and the manual valve to first and second friction elements;

a fail-safer comprising a first fail-safe valve for supplying hydraulic pressure from the first switch valve and the manual valve to a friction element operated in low L and reverse R ranges, and a second fail-safe valve for supplying hydraulic pressure from the second pressure control valve to a friction element operated in second and fourth speeds; and an N-R controller comprising an N-R control valve for supplying reverse pressure to a friction element operated in only a reverse R range.

2. The hydraulic control system of claim 1 further comprising a fourth solenoid valve disposed between the reducing valve and the regulator valve.

3. The hydraulic control system of claim 1 wherein the manual valve communicates with a line pressure line for receiving line pressure from the regulator valve, an N-D range pressure line connected to the first pressure control valve and a second fail-safe valve in neutral N and drive D ranges, a D range pressure line connected to second pressure control valve, the first switch valve, the third pressure control valve, and the second switch valve in the drive D range, and L range pressure line connected to the first switch valve in the low L range, and an R range pressure line connected to the regulator valve, the second fail-safe valve, and the N-R control valve.

4. The hydraulic control system of claim 1 wherein the first pressure control valve is provided with a first port for receiving reduced pressure from the reducing valve, a second port for receiving hydraulic pressure from the manual valve, a third port for supplying the hydraulic pressure fed through the second port to the first switch valve, and a fourth port for receiving control pressure from the first solenoid valve, the ports of the first pressure control valve being controlled by a valve spool installed in a valve body, the valve spool comprising a first land on which the hydraulic pressure fed through the first port acts, a second land on which the hydraulic pressure fed through the first port acts to open and close the second port, and a third land for selectively communicating the second port with the third port together with the second land, an elastic member being disposed between the valve body and the third land to bias the valve spool.

5. The hydraulic control system of claim 1 wherein the second pressure control valve is provided with a first port for receiving the reduced pressure from the reducing valve, a second port for receiving hydraulic pressure from the manual valve, a third port for supplying the hydraulic pressure fed through the second port to the second fail-safe valve, and a fourth port for receiving control pressure from the second solenoid valve, the ports of the second pressure control valve being controlled by a valve spool installed in a valve body, the valve spool comprising a first land on which hydraulic pressure fed through the first port acts, a second land on which hydraulic pressure fed through the first port acts to selectively open and close the second port, and a third land for selectively communicating the second port with the third port together with the second land, an elastic member being disposed between the third land and the valve body to bias the valve spool.

6. The hydraulic control system of claim 1 wherein the third pressure control valve is provided with a first port for receiving reduced pressure from the reducing valve, a second port for receiving hydraulic pressure from the manual valve, a third port for supplying the hydraulic pressure fed through the second port to the second switch valve, and a fourth port for receiving control pressure from the third solenoid valve, the ports of the third pressure control valve being controlled by a valve spool installed in a valve body, the valve spool comprising a first land on which the hydraulic pressure fed through the first port acts, a second land on which the hydraulic pressure fed through the first port acts to selectively open and close the second port, and a third land for selectively communicating the second port with the third port, an elastic member being disposed between the valve body and the third land to bias the valve spool.

7. The hydraulic control system of claim 1 wherein the first switch valve is designed to supply N-D range pressure to one of a second clutch and a first brake.

8. The hydraulic control system of claim 1 wherein the first switch valve is provided with a first port for receiving N-D range pressure from the manual valve as control pressure, a second port for receiving L range pressure from the manual valve as control pressure, a third port for receiving control pressure from the on/off solenoid valve, a fourth port for receiving hydraulic pressure from the first pressure control valve, a fifth port for supplying hydraulic pressure fed through the fourth port to the second clutch and the first and second fail-safe valves as control pressure, a sixth port for supplying hydraulic pressure fed through the fourth port to the first fail-safe valve, and first and second exhaust ports for exhausting hydraulic pressure returning to the fifth and sixth ports, the ports of the first switch valve being controlled by a valve spool installed in the valve body, the valve spool comprising a first land on which control pressure fed through the first port acts, a second land for selectively communicating the fourth port with the sixth port, a third land for selectively communicating the fourth port with the fifth port, a fourth land on which control pressure fed through the third port acts, and a fifth land on which control pressure fed through the second port acts.

9. The hydraulic control system of claim 8 wherein the first switch valve:

is controlled by control pressure fed through the first port and supplies operating pressure from the pressure control valve to a second clutch in first, second, third and fourth speeds; and is controlled by pressure control pressure fed through the second and third ports in the low L range and supplies operating pressure from the first pressure control valve to the first brake, thereby preventing hydraulic pressure from being supplied to both the second clutch and the first brake simultaneously.

10. The hydraulic pressure control system of claim 1 wherein the second switch valve:

supplies hydraulic pressure from the third pressure control valve to a fourth clutch valve and supplies N-D range pressure from the manual valve to a first clutch in second, third and fourth speeds;

is controlled by an on/off solenoid valve and supplies line pressure to the fourth clutch in neutral N, parking P and reverse R ranges; and supplies D range pressure from the manual valve to the fourth clutch and at the same time hydraulic pressure from the first pressure control valve to the first clutch.

11. The hydraulic pressure control system of claim 10 wherein the second switch valve is provided with a first port for receiving D range pressure from the manual valve, a second port for receiving control pressure from the on/off solenoid valve, a third port for receiving hydraulic pressure from the third pressure control valve, a fourth port for receiving line pressure, a fifth port for supplying the hydraulic pressure fed through the third port to the first clutch, a sixth port for supplying the hydraulic pressure fed through the first port to the first clutch, a seventh port for supplying hydraulic pressure fed through the fourth port to the fourth clutch, an eighth port for supplying hydraulic pressure fed through the third port to the fourth clutch, and first and second exhaust ports for exhausting hydraulic pressure returning to the fifth, sixth, seventh, and eighth ports, the ports of the second switch valve being controlled by a valve spool installed in the valve body, the valve spool comprising first and second lands for selectively communicating the first port with the sixth port according to control pressure fed through the first port, a third land for selectively communicating the third port with the fifth port, a fourth land for selectively communicating the third port with the eighth port, a fifth land for selectively communicating the fourth port with the seventh port, and a sixth land on which the control pressure fed through the second port acts.

12. The hydraulic control system of claim 11 wherein fluid lines respectively connected to the fifth and sixth ports communicate with the first clutch through a first shuttle valve, and a first branch line branched off from a downstream side of the first shuttle valve is connected to a second branch line branched off from an upstream side of the first port via the first check valve which prevents fluid from flowing in a reverse direction.

13. The hydraulic pressure control system of claim 12, wherein a third branch line branched off from the second branch line is connected to the first and second fail-safe valves through a second check valve.

14. The hydraulic pressure control system of claim 11 wherein fluid lines extended from the seventh and eighth ports are connected to the fourth clutch through a second shuttle valve, and a branch line branched off from a downstream side of the second shuttle valve is connected to the second fail-safe valve to supply control pressure to the second fail-safe valve.

15. The hydraulic pressure control system of claim 1 wherein the first fail-safe valve:
   is controlled by line pressure and supplies hydraulic pressure from the first switch valve to the first brake in neutral N, parking P and low L ranges; and
   supplies R range pressure from a reverse R range line to the first brake.

16. The hydraulic control system of claim 15 wherein the first fail-safe valve is provided with a first port for receiving hydraulic pressure being directed to the second clutch as control pressure, a second port for receiving hydraulic pressure being directed to the second brake as control pressure, a third port for receiving line pressure as control pressure, a fourth port for receiving hydraulic pressure from the R range pressure line and the first switch valve through a third shuttle valve, and a fifth port for supplying hydraulic pressure fed through the fourth port to the third clutch, the ports of the first fail-safe valve being controlled by a valve spool installed in the valve body, the valve spool comprising a first land on which control pressure fed through the first port acts, a second land on which control pressure fed through the second port acts, a third land for selectively communicating the fourth port with the fifth port, a fourth land for selectively communicating the fourth port with the fifth port together with the third land, and a fifth land on which control pressure fed through the third port acts.

17. The hydraulic control system of claim 1 wherein the second fail-safe valve is designed to supply hydraulic pressure from the second pressure control valve to the second brake in second and fourth speeds.

18. The hydraulic control system of claim 1 wherein the second fail-safe valve is provided with a first port for receiving R range pressure as control pressure, a second port for receiving part of hydraulic pressure being directed to the, fourth brake as control pressure, a third port for receiving part of hydraulic pressure being directed to the second clutch as control pressure, a fourth port for receiving N-D range pressure as control pressure, and a fifth port for receiving hydraulic pressure from the second pressure control valve, and a sixth port supplying hydraulic pressure fed through the fifth port to the second brake, the ports of the second fail-safe valve being controlled by a valve spool installed in the valve body, the valve spool comprising a first land on which control pressure fed through the first port acts, a second land on which control pressure fed through the second port acts, a third land on which control pressure fed through the third port acts, a fourth land for selectively communicating the fifth port with the sixth port, a fifth land for selectively communicating the fifth port with the sixth port together with the fourth land, and a sixth land on which control pressure fed through the fourth port acts.

19. The hydraulic control system of claim 1 wherein the N-R control valve is controlled by control pressure fed from the second solenoid valve, and supplies hydraulic pressure from the manual valve to the third clutch in a reverse R range.

20. The hydraulic control system of claim 1 wherein the N-R control valve is provided with a first port for receiving control pressure of the second solenoid valve, a second port connected to an R range pressure line, and a third port for supplying hydraulic pressure fed through the second port to the third clutch, the ports of the N-R control valve being controlled by a valve spool installed in the valve body, the valve spool comprising a first land on which hydraulic pressure fed through the first port acts, and a second land for selectively opening and closing the second and third ports, an elastic member being disposed between the second land and the valve body to bias the valve spool.

21. The hydraulic control system of claim 20 wherein a branch line branched off from a downstream side of the third port is connected to the R range pressure line via a third check valve.

* * * * *